US012737693B2

(12) United States Patent
Karakama et al.

(10) Patent No.: US 12,737,693 B2
(45) Date of Patent: Sep. 15, 2026

(54) LEARNING DEVICE THAT PERFORMS REINFORCEMENT LEARNING OF A POLICY OF AN AGENT, LEARNING METHOD, AND COMPUTER-READABLE STORAGE MEDIUM

(71) Applicant: MITSUBISHI HEAVY INDUSTRIES, LTD., Tokyo (JP)

(72) Inventors: Sotaro Karakama, Tokyo (JP); Natsuki Matsunami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1035 days.

(21) Appl. No.: 17/742,938

(22) Filed: May 12, 2022

(65) Prior Publication Data

US 2022/0269995 A1 Aug. 25, 2022

(30) Foreign Application Priority Data

May 17, 2021 (JP) ................................ 2021-083430

(51) Int. Cl.
*G06N 20/20* (2019.01)
*G06F 18/21* (2023.01)
*G06F 18/214* (2023.01)

(52) U.S. Cl.
CPC ........... *G06N 20/20* (2019.01); *G06F 18/214* (2023.01); *G06F 18/2178* (2023.01)

(58) Field of Classification Search
CPC ........ G06N 20/20; G06N 3/006; G06N 20/00; G06F 18/214; G06F 18/2178; G06V 20/00
See application file for complete search history.

(56) References Cited

U.S. PATENT DOCUMENTS 11,627,165 B2 * 4/2023 Silver .................. G06F 18/214 726/1
2019/0272558 A1 9/2019 Suzuki et al.
2020/0279136 A1 * 9/2020 Subramanian ......... G06N 20/00

FOREIGN PATENT DOCUMENTS

| | | |
|---|---|---|
| CN | 112052511 | 12/2020 |
| JP | 2021-13750 | 2/2021 |
| WO | 2018/110305 | 6/2018 |

OTHER PUBLICATIONS

OpenAI, OpenAI, et al. "Asymmetric self-play for automatic goal discovery in robotic manipulation." arXiv preprint arXiv:2101.04882 (2021). (Year: 2021).*

(Continued)

*Primary Examiner* — Beau D Spratt
*Assistant Examiner* — Megan Elizabeth Hwang
(74) *Attorney, Agent, or Firm* — Wenderoth, Lind & Ponack, L.L.P.

(57) ABSTRACT

A learning device is configured to perform reinforcement learning of a policy of an agent by self-play under a multi-agent environment. The multi-agent environment is an asymmetric environment in which at least one of a type of an action performed by the agent, a type of a state acquired by the agent, and a definition of a reward given to the agent is different, and an evaluation index for learning is given to each of agents. The learning device performs performing learning of a predetermined agent of the agents by using a learning model, acquiring the evaluation index for the learning model of the predetermined agent after learning, comparing the evaluation index for the predetermined agent with the evaluation index for the other agent, and a step of setting the agent having a lower evaluation index as a learning target.

3 Claims, 5 Drawing Sheets

(56) References Cited

OTHER PUBLICATIONS

Zhang, Huan, et al. "Robust reinforcement learning on state observations with learned optimal adversary." arXiv preprint arXiv: 2101.08452 (2021). (Year: 2021).*

Kiourt, Chairi, Dimitris Kalles, and George Pavlidis. "Human rating methods on multi-agent systems." European Conference on Multi-Agent Systems. Cham: Springer International Publishing, 2015. (Year: 2015).*

Carroll, Micah, et al. "On the utility of learning about humans for human-ai coordination." Advances in neural information processing systems 32 (2019). (Year: 2019).*

Ouyang, Xu, Ying Chen, and Gady Agam. "Accelerated WGAN update strategy with loss change rate balancing." Proceedings of the IEEE/CVF winter conference on applications of computer vision. 2021. (Year: 2020).*

Jaderberg, Max, et al. "Human-level performance in first-person multiplayer games with population-based deep reinforcement learning." arXiv preprint arXiv:1807.01281 (2018). (Year: 2018).*

Shah, Ryan, and Shishir Nagaraja. "A game-theoretic analysis of DoS attacks on driverless vehicles." arXiv preprint arXiv: 1902.09590 (2019). (Year: 2019).*

Vinyals, Oriol, et al. "Grandmaster level in StarCraft II using multi-agent reinforcement learning." nature 575.7782 (2019): 350-354. (Year: 2019).*

Extended European Search Report issued Nov. 14, 2022 in corresponding European Patent Application No. 22172737.3.

Guanyu Zhang et al., "Efficient Training Techniques for Multi-Agent Reinforcement Learning in Combat Tasks", IEEE Access, vol. 7, Aug. 21, 2019 (Aug. 21, 2019), pp. 109301-109310, XP011740787, DOI: 10.1109/ACCESS.2019.2933454 [retrieved on Aug. 15, 2019].

Guiyang Luo et al., "Multiagent Adversarial Collaborative Learning via Mean-Field Theory", IEEE Transactions on Cybernetics, IEEE, Piscataway, NJ, USA, vol. 51, No. 10, Oct. 23, 2020 (Oct. 23, 2020), pp. 4994-5007, XP011882732, ISSN: 2168-2267, DOI: 10.1109/TCYB.2020.3025491.

Trapit Bansal et al., "Emergent Complexity 1-5 via Multi-Agent Competition", aarxiv.org, Cornell University Library, 201 Olin Library Cornell University Ithaca, NY 14853, Oct. 10, 2017 (Oct. 10, 2017), XP081310233.

Adam Gleave et al., "Adversarial Policies: 1-5 Attacking Deep Reinforcement Learning", arxiv.org, Cornell University Library, 201 Olin Library Cornell University Ithaca, NY 14853, Jan. 17, 2021 (Jan. 17, 2021), XP081861994.

* cited by examiner

LEARNING DEVICE THAT PERFORMS REINFORCEMENT LEARNING OF A POLICY OF AN AGENT, LEARNING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2021-083430 filed in Japan on May 17, 2021.

FIELD

The present disclosure relates to a learning device, a learning method, and a computer-readable storage medium for a multi-agent environment.

BACKGROUND

In the related art, as reinforcement learning among a plurality of agents, it is known that there is a system for providing a Go game service learned by deep learning. This system executes learning by self-play using a positional judgement model.

CITATION LIST

Patent Literature

Patent Literature 1: Japanese Patent Application Laid-open No. 2021-013750

SUMMARY

Technical Problem

The reinforcement learning in Patent Literature 1 is used for a Go game service, so that conditions for learning are the same among a plurality of agents. On the other hand, in reinforcement learning among a plurality of agents, conditions for learning such as a reward may be different among the agents. In this case, when a progress degree of learning by a predetermined agent is dissociated from a progress degree of learning by another agent because the conditions for learning are different, a progress degree of learning may be retarded. At the time of learning by the predetermined agent, an action of the other agent does not contribute to learning by the predetermined agent because the conditions for learning are different, so that learning by the predetermined agent does not proceed in some cases. In this way, in a case in which conditions for learning are different among a plurality of agents, learning efficiency of reinforcement learning may be lowered.

Thus, the present disclosure provides a learning device, a learning method, and a computer-readable storage medium that can efficiently perform reinforcement learning of a plurality of agents under an asymmetrical environment.

Solution to Problem

A learning device according to one aspect of the present disclosure includes a processing unit configured to perform reinforcement learning of a policy of an agent by self-play under a multi-agent environment in which a plurality of the agents are present. The multi-agent environment is an asymmetric environment in which at least one of a type of an action performed by the agent, a type of a state acquired by the agent, and a definition of a reward given to the agent is different between the agent. An evaluation index for learning is given to each of the agents. The processing unit performs performing learning of a predetermined agent of the agents by using a learning model, acquiring the evaluation index for the learning model of the predetermined agent after learning, comparing the evaluation index for the predetermined agent with the evaluation index for the other agent, and setting the agent having a lower evaluation index as a learning target.

A learning method according to another aspect of the present disclosure is for performing reinforcement learning of a policy of an agent by self-play under a multi-agent environment in which a plurality of the agents are present. The multi-agent environment is an asymmetric environment in which at least one of a type of an action performed by the agent, a type of a state acquired by the agent, and a definition of a reward given to the agent is different between the agents. An evaluation index for learning is given to each of the agents. The learning method performs performing learning of a predetermined agent of the agents by using a learning model, acquiring the evaluation index for the learning model of the predetermined agent after learning, comparing the evaluation index for the predetermined agent with the evaluation index for the other agent, and setting the agent having a lower evaluation index as a learning target.

A non-transitory computer-readable storage medium according to still another aspect of the present disclosure stores a learning program for performing reinforcement learning of a policy of an agent by self-play under a multi-agent environment in which a plurality of the agents are present in a learning device. The multi-agent environment is an asymmetric environment in which at least one of a type of an action performed by the agent, a type of a state acquired by the agent, and a definition of a reward given to the agent is different between the agents. An evaluation index for learning is given to each of the agents. The learning program, when executed by a computer of the learning device, causes the learning device to execute: performing learning of a predetermined agent of the agents by using a learning model, acquiring the evaluation index for the learning model of the predetermined agent after learning, comparing the evaluation index for the predetermined agent with the evaluation index for the other agent, and setting the agent having a lower evaluation index as a learning target.

Advantageous Effects of Invention

According to the present disclosure, reinforcement learning of a plurality of agents can be efficiently performed under an asymmetrical environment.

DESCRIPTION OF EMBODIMENTS

The following describes an embodiment according to the present invention in detail based on the drawings. The present invention is not limited to the embodiment. Constituent elements in the following embodiment include a constituent element that can be easily substituted by those skilled in the art, and substantially the same constituent element. Furthermore, the constituent elements described below can be appropriately combined with each other, and in a case in which there are a plurality of embodiments, the embodiments can also be combined with each other.

Embodiment

A learning device 10 and a learning method according to the present embodiment are a device and a method for performing, under an environment in which a plurality of agents 5 that perform actions, that is, under a multi-agent environment, reinforcement learning on each of the agents 5. As the agent 5, for example, a machine that can perform an action such as a robot, a vehicle, a ship, or an aircraft is applied.

In the present embodiment, the multi-agent environment is an asymmetric environment in which at least one of a type of an action performed by the agent 5, a type of a state acquired by the agent 5, and a definition of a reward given to the agent 5 is different between the agents 5.

The present embodiment is under a fighting environment in which the agent 5 as a kicker and the agent 5 as a keeper perform Free Kick (FK) fighting, for example, as the multi-agent environment. In the following description, the present embodiment is applied to the FK fighting environment, that is, an asymmetric fighting environment as the multi-agent environment, but the environment is not particularly limited so long as the environment is an asymmetric environment. That is, the environment may be a cooperative environment in which the agents 5 perform cooperative operations so long as the environment is an asymmetric environment.

Figure 1:
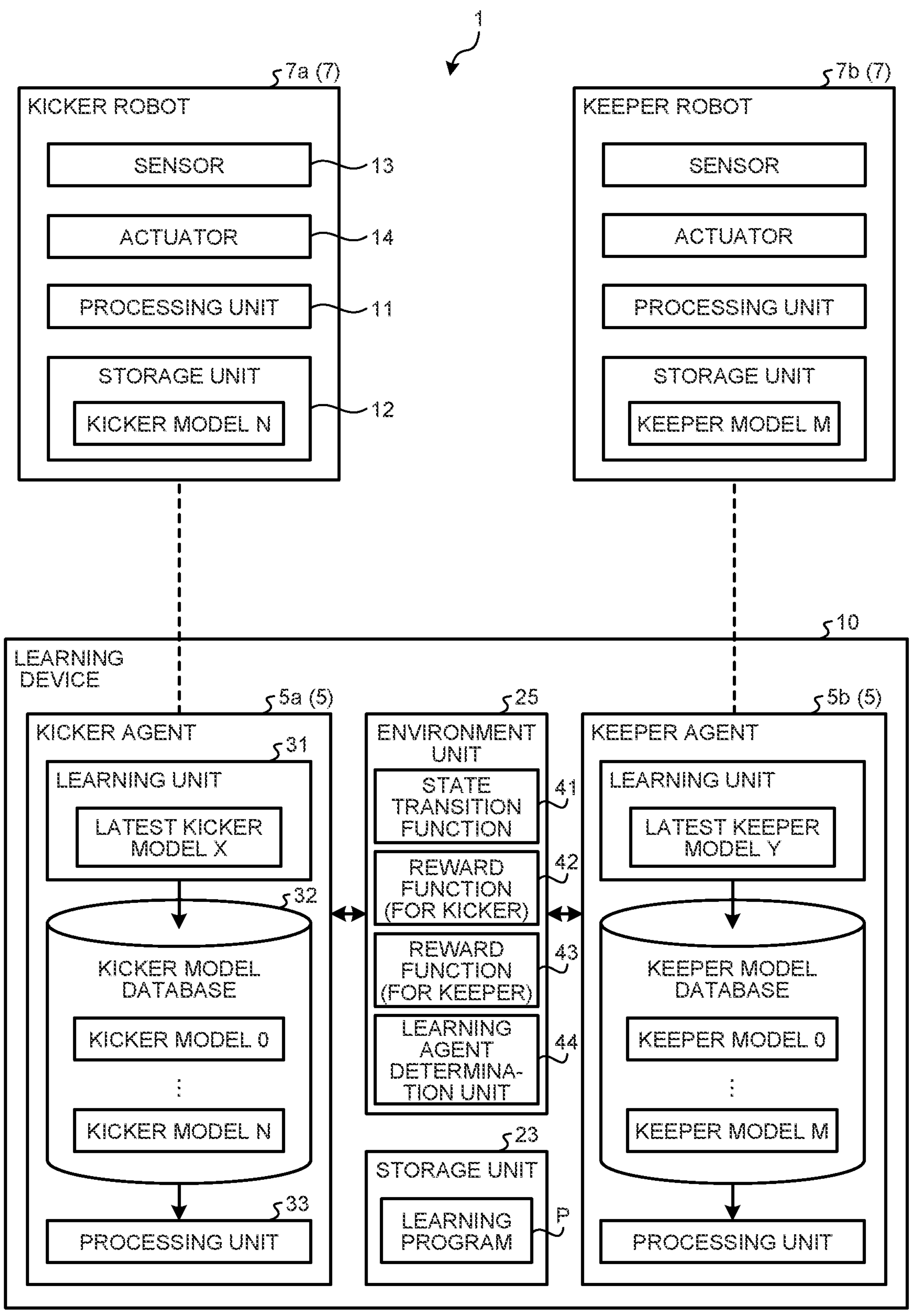
FIG. 1 is a diagram schematically representing a learning system including a learning device according to the present embodiment.
Figure 2:
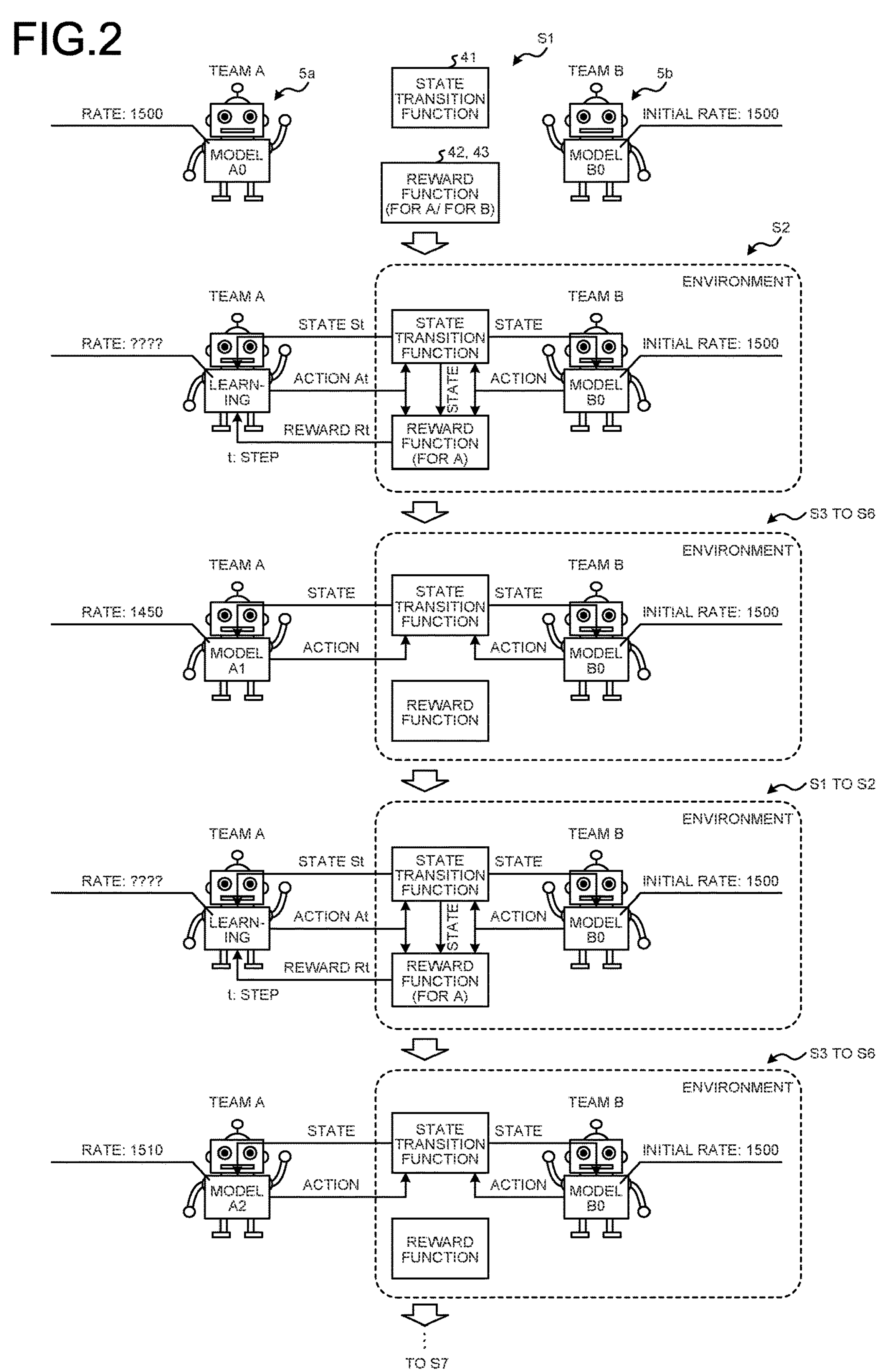
FIG. 2 is an explanatory diagram of a learning method according to the present embodiment.
Figure 3:
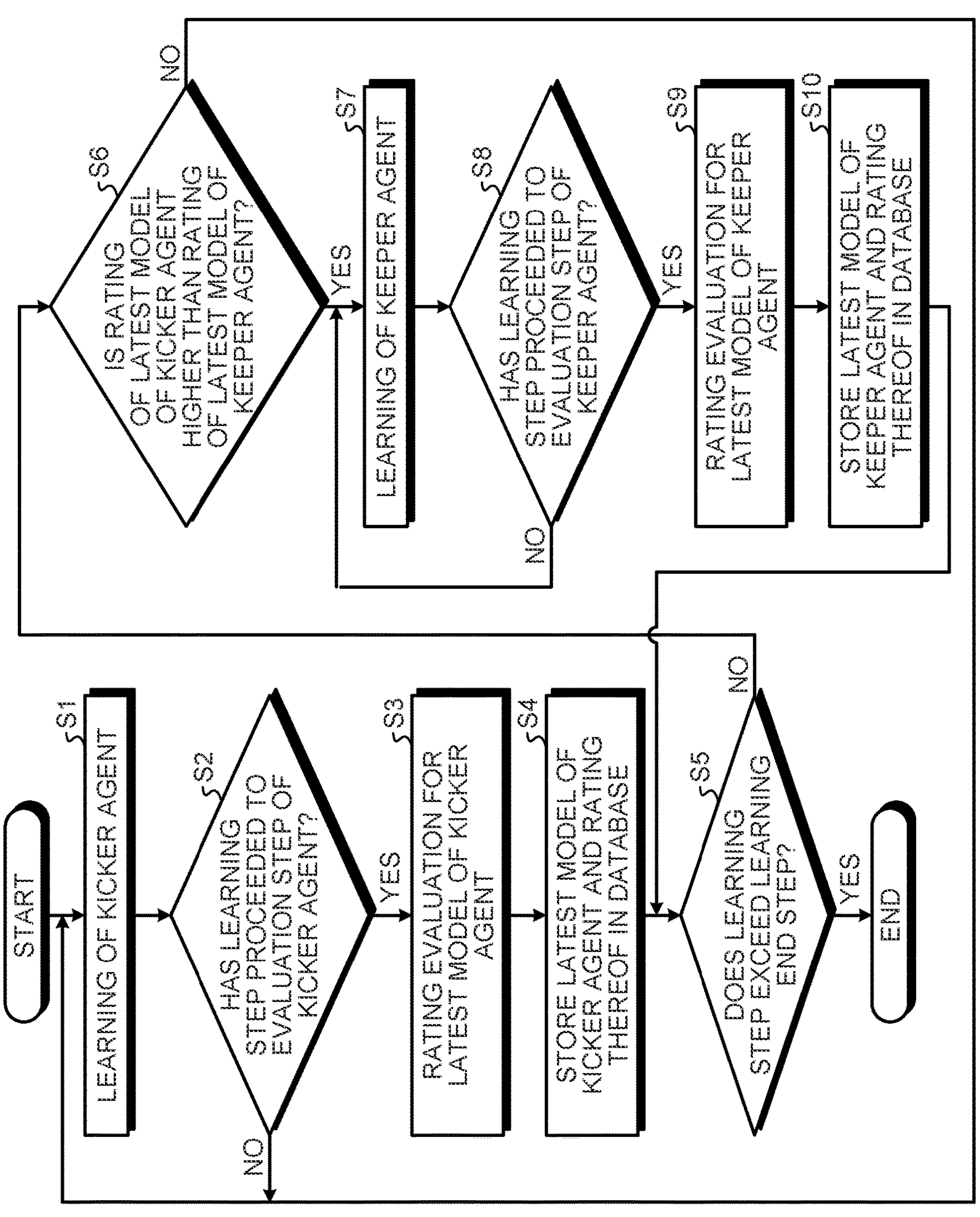
FIG. 3 is a diagram illustrating a procedure of the learning method according to the present embodiment.
Figure 4:
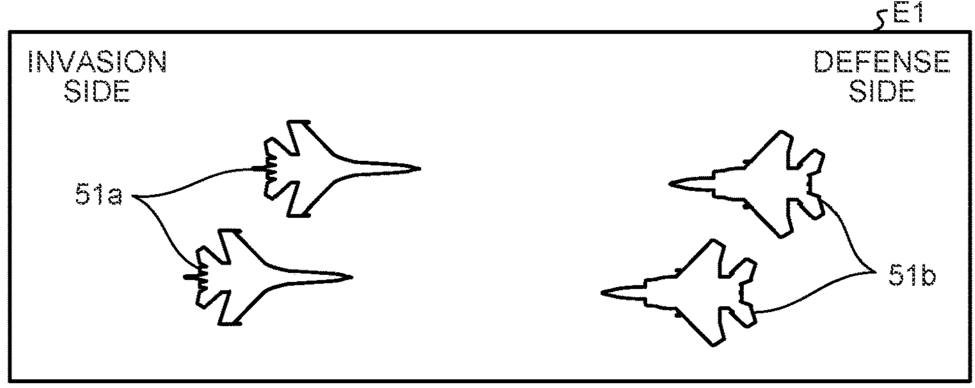
FIG. 4 is a diagram illustrating an example of a multi-agent environment.
Figure 4:
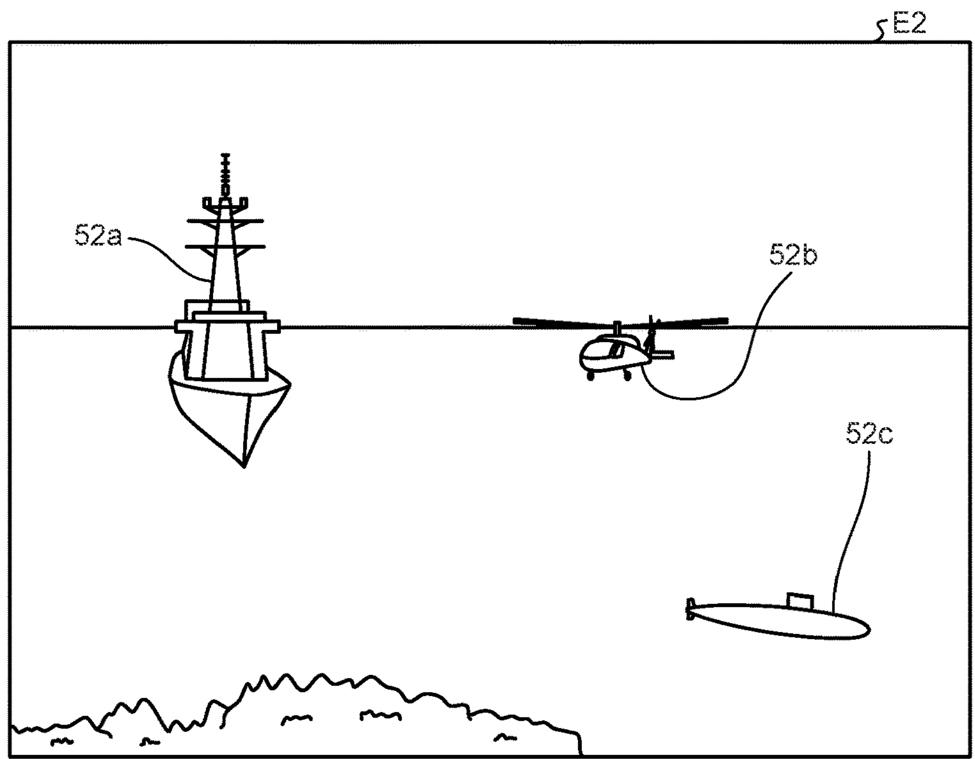
Figure 4:
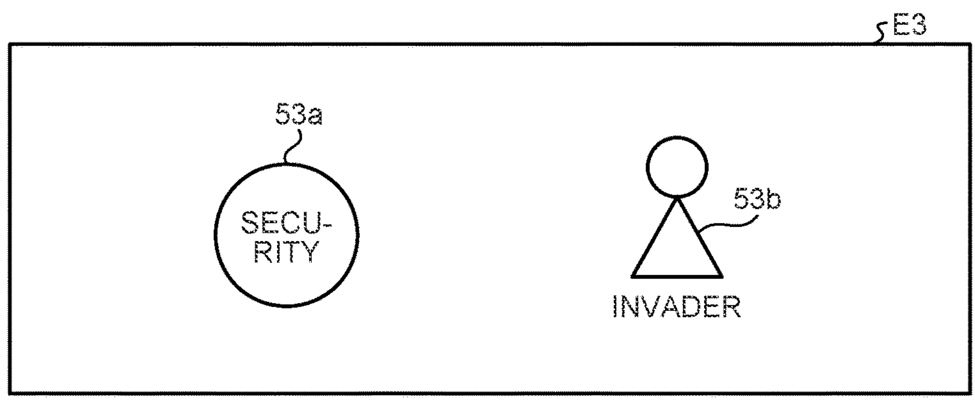
Figure 5:
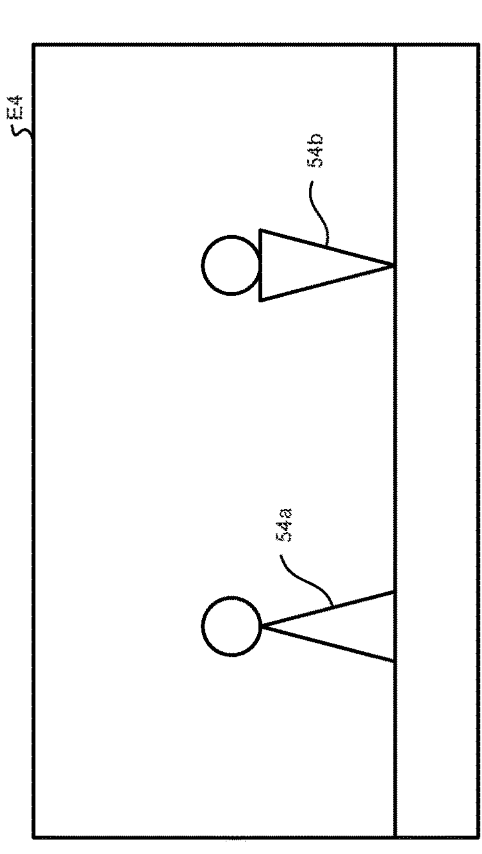
FIG. 5 is a diagram illustrating an example of the multi-agent environment.
Figure 5:
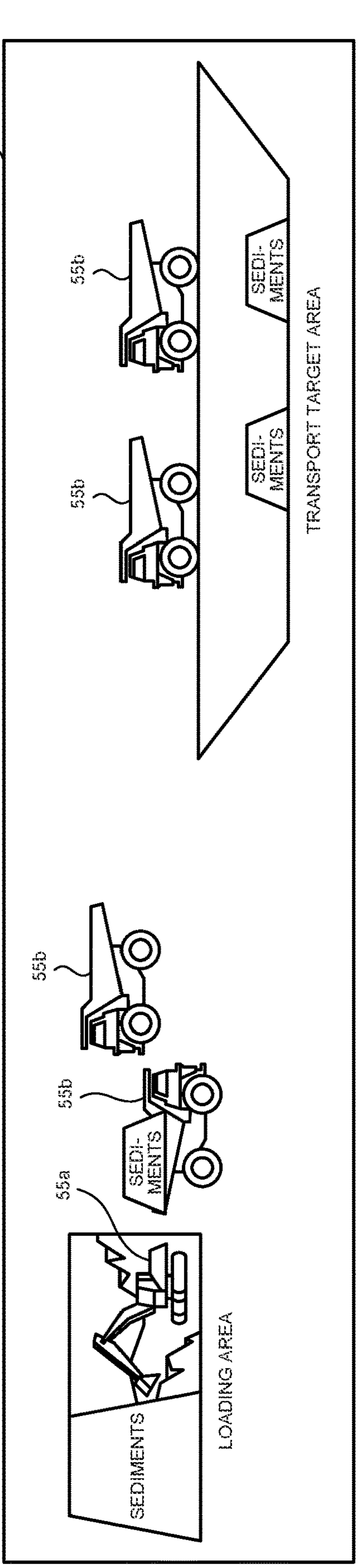

FIG. 1 is a diagram schematically representing a system including the learning device according to the present embodiment. FIG. 2 is an explanatory diagram of the learning method according to the present embodiment. FIG. 3 is a diagram illustrating a procedure of the learning method according to the present embodiment. FIG. 4 is a diagram illustrating an example of the multi-agent environment. FIG. 5 is a diagram illustrating an example of the multi-agent environment.

System

As illustrated in FIG. 1, the learning device 10 is a device for learning of learning models installed in a plurality of robots 7 disposed in a system 1. The system 1 is present under an asymmetric environment, and includes the robots 7 as targets of the agents 5, and the learning device 10 for learning of actions (policies) of the robots 7.

The robots 7 include a kicker robot 7*a* for a kicker and a keeper robot 7*b* for a keeper. In the present embodiment, a configuration is for the FK fighting environment, and therefore uses the two robots opposed to each other, but three or more agents 5 may be included depending on the environment.

Each of the robots 7 includes a processing unit 11, a storage unit 12, a sensor 13, and an actuator 14. The processing unit 11 includes, for example, an integrated circuit such a central processing unit (CPU). The processing unit 11 executes operation control based on the learning model. The storage unit 12 is an optional storage device such as a semiconductor storage device and a magnetic storage device. The storage unit 12 stores the learning model. Specifically, the storage unit 12 of the kicker robot 7*a* stores a kicker model (kicker model N) as the learning model for a kicker. The storage unit 12 of the keeper robot 7*b* stores a keeper model (keeper model M) as the learning model for a keeper. The sensor 13 acquires a state (St: state) of the robot 7. The sensor 13 is connected to the processing unit 11, and outputs the acquired state St to the processing unit 11. The sensor 13 is, for example, a speed sensor, an acceleration sensor, and the like. The actuator 14 is an operation unit that causes the robot 7 to perform a predetermined action. The actuator 14 is connected to the processing unit 11, and performs an action (At: action) by being subjected to operation control by the processing unit 11.

When the state St is input from the sensor 13, the processing unit 11 of each of the robots 7 selects a predetermined action (At: action) by using the learning model based on the state St, and executes operation control for the actuator 14.

As the learning model stored in the storage unit 12 of each of the robots 7, a model learned by the learning device 10 (described later) is stored.

Learning Device

The learning device 10 performs reinforcement learning of the agents 5 under the multi-agent environment as a virtual space. In the learning device 10, a policy of the agent 5 is subjected to reinforcement learning by self-play. The learning device 10 includes the agents 5, an environment unit 25, and a storage unit 23.

The agents 5 include a kicker agent 5*a* for a kicker and a keeper agent 5*b* for a keeper. Each of the agents 5 includes a learning unit 31, a database 32, and a processing unit 33. The learning unit 31, the database 32, and the processing unit 33 of the kicker agent 5*a* may be integrated with the learning unit 31, the database 32, and the processing unit 33 of the keeper agent 5*b*, and a hardware configuration is not particularly limited.

The learning unit 31 performs learning of the learning model. The learning unit 31 performs learning based on a reward (Rt: reward) given from the environment unit 25. Specifically, the learning unit 31 performs learning so that the reward given to each of the agents 5 is maximized.

The database 32 is a storage device that stores the learning model after learning. The database 32 accumulates learning models by storing the learning model every time learning is performed. In the database 32 for a kicker, kicker models from an initial kicker model 0 to a predetermined kicker model N are accumulated. In the database 32 for a keeper, keeper models from an initial keeper model 0 to a predetermined keeper model M are accumulated.

The processing unit 33 executes operation control based on the learning model similarly to the processing unit 11. When the state St is input from the environment unit 25 (described later), the processing unit 11 selects and performs a predetermined action (At: action) by using the learning model based on the state St.

The environment unit 25 provides the multi-agent environment for the agents 5. Specifically, the environment unit 25 gives the reward Rt to the agents 5, or derives the state St of each of the agents 5 that makes a transition in accordance with the action At. Additionally, the environment unit 25 calculates an evaluation index of learning, or selects a learning target based on the evaluation index.

The environment unit 25 includes a state transition processing unit 41, a reward giving unit 42 for a kicker, a reward giving unit 43 for a keeper, and a learning agent determination unit 44.

The state transition processing unit 41 receives actions At performed by the agents 5 as inputs, and calculates the state St of each of the agents 5 to be an output by using a state transition function for calculating a state transition. The state transition processing unit 41 outputs the calculated state St to the learning unit 31 of each of the agents 5. The state transition processing unit 41 also outputs the calculated state St to the reward giving units 42 and 43.

The reward giving units 42 and 43 receives the action At performed by each of the agents 5, the state St, and a state St+1 of a transition destination as inputs, and calculates the reward Rt given to each of the agents 5 to be an output by using a reward function for calculating the reward. The reward giving units 42 and 43 output the calculated reward Rt to the learning unit 31 of each of the agents 5. As the reward function for the kicker agent 5*a*, for example, the reward is "+1" when a goal is scored, and the reward is "−1" when the goal is not scored. As the reward function for the keeper agent 5*b*, for example, the reward is "−1" when the goal is scored, and the reward is "+1" when the goal is not scored.

As described above, the learning agent determination unit 44 calculates the evaluation index for learning, or selects the learning target based on the evaluation index. As the evaluation index for learning, used is an ELO rating, a rating indicating strengths of the kicker agent 5*a* and the keeper agent 5*b* in the present embodiment. The evaluation index for learning is not particularly limited to the ELO rating, but a Glicko rating may be used. The learning agent determination unit 44 calculates the rating of each of the agents 5 for each learning process, and acquires the rating in association with the learning model of the agent 5. That is, the rating associated with each learning model is stored in the database 32.

Because it is under the asymmetric environment, the evaluation index for learning is different between the agents 5. For example, the evaluation index for a kicker is used for the kicker agent 5*a*, and the evaluation index for a keeper is used for the keeper agent 5*b*. A calculation model for obtaining the evaluation index may be the same therebetween, but input values input to the calculation model are an input value for a kicker for the kicker agent 5*a* and an input value for a keeper for the keeper agent 5*b*.

The learning agent determination unit 44 uses the acquired rating for selecting the agent as a learning target from the agents 5. Specifically, the learning agent determination unit 44 compares the rating for the kicker agent 5*a* with the rating for the keeper agent 5*b*, and selects the agent having a lower rating as the agent 5 to be the learning target.

Similarly to the storage unit 12, the storage unit 23 is an optional storage device such as a semiconductor storage device and a magnetic storage device. The storage unit 23 stores a learning program P for performing the learning described above, or performing the learning method (described later).

In the learning device 10, each of the agents 5 acquires the state St from the state transition processing unit 41 of the environment unit 25 at the time of reinforcement learning, and acquires the reward Rt from the reward giving units 42 and 43 of the environment unit 25. Each of the agents 5 then selects the action At from the learning model based on the acquired state St and reward Rt by the learning unit 31. The respective learning units 31 input the selected actions At to the state transition processing unit 41 and the reward giving units 42 and 43 of the environment unit 25. The reward giving units 42 and 43 each calculate the reward Rt based on the selected action At, the state St, and the state St+1 of the transition destination. The state transition processing unit 41 calculates the state St+1 after the transition based on the selected action At. The learning unit 31 of each of the agents 5 repeatedly performs the learning described above by a predetermined number of steps that can be evaluated (number of evaluation steps) so that the reward Rt given to each of the agents 5 is maximized, and performs learning of the learning model.

Learning Method

Next, the following describes the learning method performed by the learning device 10 with reference to FIG. 2 and FIG. 3. In the learning method, first, learning of the predetermined agent 5*a* of the agents 5 is performed by using the learning model (Step S1). Specifically, at Step S1, learning of the kicker agent 5*a* is performed. At this point, the rating for the kicker agent 5*a* and the rating for the keeper agent 5*b* are the same value (for example, 1500). In a case of the same rating, any of the agents 5 may be selected. The agent 5 that has not been selected becomes the agent 5 not to be the learning target, and is treated as one element of an environment under the multi-agent environment, that is, the agent 5 that performs an action based on a fixed learning model.

After performing Step S1, the learning device 10 performs learning of the kicker model by the kicker agent 5*a* and the environment unit 25, and determines whether a learning step of the kicker model becomes an evaluation step (Step S2). If it is determined that the learning step has not proceeded to the evaluation step (No at Step S2), the learning device 10 repeatedly performs the learning step until the learning step becomes the evaluation step. At Step S2, if the learning device 10 determines that the learning step has proceeded to the evaluation step (Yes at Step S2), the learning device 10 calculates, by the learning agent determination unit 44, the rating for the latest kicker model after the learning (Step S3). At Step S3, the rating for the kicker model after the learning becomes 1450, for example. After performing Step S3, the learning device 10 associates the latest kicker model with the rating to be stored in the database 32 (Step S4). After performing Step S4, the learning device 10 determines whether the learning step performed for causing the agent 5 to learn exceeds a learning end step as the learning step as an end (Step S5).

If it is determined that the learning step exceeds the learning end step at Step S5 (Yes at Step S5), the learning device 10 ends a series of processing related to the learning method. On the other hand, if it is determined that the learning step is equal to or smaller than the learning end step at Step S5 (No at Step S5), the learning device 10 advances the process to Step S6.

At Step S6, the learning device 10 determines whether the rating for the latest kicker model of the kicker agent 5*a* is higher than the rating for the latest keeper model of the keeper agent 5*b* by the learning agent determination unit 44. As illustrated in a center diagram of FIG. 2, in a case in which the rating for the kicker model (1450) is equal to or smaller than the rating for the keeper model (1500), the learning device 10 advances the process to Step S1 again, and performs learning of the kicker model. On the other hand, as illustrated in a lower diagram of FIG. 2, in a case in which the rating for the kicker model (1510) becomes larger than the rating for the keeper model (1500) due to relearning and the like, the learning device 10 performs learning of the keeper model (Step S7).

At Step S7, learning of the keeper agent 5*b* is performed. After performing Step S7, the learning device 10 performs learning of the keeper model by the keeper agent 5*b* and the environment unit 25, and determines whether the learning step of the keeper model becomes the evaluation step (Step S8). If it is determined that the learning step has not proceeded to the evaluation step (No at Step S8), the learning device 10 repeatedly performs the learning step until the learning step becomes the evaluation step. At Step S8, if the learning device 10 determines that the learning step has proceeded to the evaluation step (Yes at Step S8), the learning device 10 calculates, by the learning agent determination unit 44, the rating for the latest keeper model after the learning (Step S9). After performing Step S9, the learning device 10 associates the latest keeper model with the rating to be stored in the database 32 (Step S10). After performing Step S10, the learning device 10 advances the process to Step S5, and repeatedly performs Step S1 to Step S10 until the learning step exceeds the learning end step.

In this way, the agents 5 and the environment unit 25 that perform Step S1 to Step S10 described above function as processing units configured to perform reinforcement learning of a policy of the agent 5 by self-play.

Multi-Agent Environment

Next, the following describes the multi-agent environment with reference to FIG. 4 and FIG. 5. The multi-agent environment is not limited to the FK fighting environment as described above. For example, as illustrated in an upper diagram of FIG. 4, the multi-agent environment may be an environment E1 in which a plurality of agents 51*a* as unmanned aerial vehicles on an invasion side fight against a plurality of agents 51*b* as unmanned aerial vehicles on a defense side. In the environment E1, actions At performed by the unmanned aerial vehicles on the invasion side and the unmanned aerial vehicles on the defense side include an action corresponding to airframe performance. Additionally, states St acquired by the unmanned aerial vehicles on the invasion side and the unmanned aerial vehicles on the defense side include a measurement result of a radar. Furthermore, the reward Rt for the unmanned aerial vehicle is different between the invasion side and the defense side. In this case, the evaluation index is a rating based on victory or defeat of the unmanned aerial vehicles on the invasion side and the unmanned aerial vehicles on the defense side. When the learning model learned by the unmanned aerial vehicle on the defense side in the multi-agent environment E1 is installed in an unmanned aerial vehicle as an actual vehicle, the unmanned aerial vehicle can perform defense based on the learning model that has been learned.

As illustrated in a center diagram of FIG. 4, the multi-agent environment may be an environment E2 in which a plurality of agents 52*a* and 52*b* as a plurality of unmanned vehicles on the defense side fight against an agent 52*c* as an unmanned vehicle on the invasion side. The agent 52*a* is an unmanned surface ship, the agent 52*b* is an unmanned aerial vehicle, and the agent 52*c* is an unmanned submarine. In the environment E2, the actions At performed by the unmanned submarine on the invasion side, the unmanned surface ship on the defense side, and the unmanned aerial vehicle on the defense side include different actions corresponding to types of vehicles. The states St acquired by the unmanned submarine on the invasion side, the unmanned surface ship on the defense side, and the unmanned aerial vehicle on the defense side include a detection result obtained by sonar. Additionally, rewards Rt for the unmanned submarine, the unmanned surface ship, and the unmanned aerial vehicle are different between the invasion side and the defense side. In this case, the evaluation index is a rating based on victory or defeat of the unmanned submarine on the invasion side, and the unmanned surface ship and the unmanned aerial vehicle on the defense side. When the learning model learned by the unmanned surface ship and the unmanned aerial vehicle on the defense side in the multi-agent environment E2 is installed in an unmanned surface ship and an unmanned aerial vehicle as actual vehicles, the unmanned surface ship and the unmanned aerial vehicle can perform defense based on the learning model that has been learned.

As illustrated in a lower diagram of FIG. 4, the multi-agent environment may be an environment E3 in which an agent 53*a* as a security robot and an agent 53*b* as an invader are present. In the environment E3, the action At performed by the security robot is movement and standby at a charging position, and the action At performed by the invader is movement. The states St acquired by the security robot include a camera image, a self-position, and a position of another security robot. The states St acquired by the invader include a self-position. The rewards Rt for the security robot include "+1" in a case of discovering the invader and "−1" in a case in which the invader invades a predetermined area, and the rewards Rt for the invader include "−1" in a case of being discovered by the security robot and "+1" in a case in which the invader invades the predetermined area. In this case, the evaluation index is a rating based on victory or defeat of the security robot and the invader. When the learning model learned by the security robot in the multi-agent environment E3 is installed in a security robot as an actual device, the security robot can conduct security based on the learning model that has been learned.

As illustrated in an upper diagram of FIG. 5, the multi-agent environment may be an environment E4 in which an agent 54*a* as a predetermined game character fights against an agent 54*b* as another game character. The actions At performed by respective game characters include movement and an attack, which are different among the game characters. The states St acquired by the respective game characters include a game screen, a position of an enemy character, and the like. The rewards Rt for the respective game characters include "+1" in a case of defeating an enemy, and "−1" in a case of being defeated by the enemy. In this case, the evaluation index is a rating based on victory or defeat of each game character. When the learning model learned by each game character in the multi-agent environment E4 is executed on a fighting game, each game character can perform an action based on the learning model that has been learned.

As illustrated in a lower diagram of FIG. 5, the multi-agent environment may be an environment E5 in which an agent 55*a* as a power shovel and an agent 55*b* as a dump truck perform cooperative work. The actions At performed by the power shovel include movement and a shovel operation, and the actions At performed by the dump truck include movement and an operation of unloading sediments. The states St acquired by the power shovel and the dump truck include a position of the power shovel and a position of the dump truck. The reward Rt for the power shovel is "0 to +1" corresponding to an amount of sediments when the sediments are loaded on the dump truck, and "−1" when the power shovel collides with the dump truck. The reward Rt for the dump truck is "0 to +1" corresponding to a transportation amount and a transportation distance of the sediments, and "−1" when the dump truck collides with the dump truck and the power shovel. In this case, the evaluation index is a rating based on an amount of sediments completely loaded on the dump truck in a case of the power shovel, and is a rating based on transported sediments and a transportation distance in a case of the dump truck. When the learning model learned by the dump truck and the power shovel in the multi-agent environment E5 is installed in a dump truck and a power shovel as actual vehicles, the dump truck and the power shovel can perform cooperative work for transporting sediments based on the learning model that has been learned.

In the present embodiment, the step of comparing the ratings with each other is performed at Step S6, but a difference between the ratings for the agents 5 may be calculated. In a case in which the difference calculated at Step S6 is not reduced even if the learning step is repeatedly performed, the learning device 10 may determine that the learning has not progressed, and may change the learning model of the agent 5 to the learning model associated with a different rating. Specifically, if it is determined that the learning has not progressed based on the calculated difference, the learning device 10 may change the learning model to the learning model having the highest rating, for example.

As described above, the learning device 10, the learning method, and the learning program P described in the present embodiment are grasped as follows, for example.

The learning device 10 according to a first aspect is the learning device 10 including the processing units (the agent 5 and the environment unit 25) configured to perform reinforcement learning of the policy of the agent 5 by self-play under the multi-agent environment in which the agents 5 are present. The multi-agent environment is an asymmetric environment in which at least one of the type of the action At performed by the agent 5, the type of the state St acquired by the agent 5, and a definition of the reward Rt given to the agent 5 is different between the agents 5, and the evaluation index for learning is given to each of the agents 5. The processing unit performs Steps S1 and S7 for performing learning of the predetermined agent 5 among the agents 5 by using the learning model, Steps S3 and S9 for acquiring the evaluation index for the learning model of the predetermined agent 5 after the learning, Step S6 for comparing the evaluation index for the predetermined agent 5 with the evaluation index for the other agent 5, and Steps S1 and S7 for setting the agent 5 having a lower evaluation index as a learning target.

The learning method according to a fourth aspect is a learning method for performing reinforcement learning of the policy of the agent 5 by self-play under the multi-agent environment in which the agents 5 are present. The multi-agent environment is an asymmetric environment in which at least one of the type of the action At performed by the agent 5, the type of the state St acquired by the agent 5, and a definition of the reward Rt given to the agent 5 is different between the agents 5, and the evaluation index for learning is given to each of the agents 5. In this learning method, performed are Steps S1 and S7 for performing learning of the predetermined agent 5 among the agents 5 by using the learning model, Steps S3 and S9 for acquiring the evaluation index for the learning model of the predetermined agent 5 after the learning, Step S6 for comparing the evaluation index for the predetermined agent 5 with the evaluation index for the other agent 5, and Steps S1 and S7 for setting the agent 5 having a lower evaluation index as a learning target.

The learning program P according to a fifth aspect is a learning program P to be executed by the learning device 10 configured to perform reinforcement learning of the policy of the agent 5 by self-play under the multi-agent environment in which the agents 5 are present. The multi-agent environment is an asymmetric environment in which at least one of the type of the action At performed by the agent 5, the type of the state St acquired by the agent 5, and a definition of the reward Rt given to the agent 5 is different between the agents 5, and the evaluation index for learning is given to each of the agents 5. The learning device 10 is caused to perform Steps S1 and S7 for performing learning of the predetermined agent 5 among the agents 5 by using the learning model, Steps S3 and S9 for acquiring the evaluation index for the learning model of the predetermined agent after the learning, Step S6 for comparing the evaluation index for the predetermined agent with the evaluation index for the other agent, and Steps S1 and S7 for setting the agent having a lower evaluation index as a learning target. The learning device 10 may include a computer including at least a processor and a memory; the learning program P may be stored on a (non-transitory) computer-readable storage medium, such as a magnetic disk, an optical disc, or a semiconductor memory, to be executed by the computer.

With these configurations, the agent 5 having a lower evaluation index can be learned in preference to the other agent 5. Due to this, progress degrees of learning of the agents 5 can be prevented from being dissociated from each other. By performing learning on the predetermined agent 5 having a lower evaluation index with priority, at the time of learning by the other agent, the other agent can perform learning based on the predetermined agent 5 the learning by which has progressed. Due to this, the other agent can avoid learning based on the agent 5 the learning by which has not progressed (the evaluation index is low), and it is possible to reduce learning in a state in which the learning has not progressed. Accordingly, reinforcement learning of the agents 5 under the asymmetrical environment can be efficiently performed.

As a second aspect, the evaluation index for learning is a rating.

With this configuration, a rating as an appropriate index can be used as the evaluation index for learning, so that it is possible to appropriately advance reinforcement learning of the agents 5.

As a third aspect, a difference between the evaluation index for the predetermined agent 5 and the evaluation index for the other agent 5 is calculated at Step S6 for comparing evaluation indexes with each other, and in a case in which it is determined that learning has not progressed based on the calculated difference, the learning model of the agent 5 the learning by which has not progressed is changed to the learning model having a different evaluation index.

With this configuration, even in a state in which the learning cannot progress such that a difference between the ratings for the agents 5 is not reduced, it is possible to advance the learning by using the learning model different from the evaluation index before the change.

REFERENCE SIGNS LIST

- 1 System
- 5 Agent
- 10 Learning device
- 11 Processing unit
- 12 Storage unit
- 13 Sensor
- 14 Actuator
- 23 Storage unit
- 25 Environment unit

31 Learning unit
32 Database
33 Processing unit
41 State transition processing unit
42 Reward giving unit for kicker
43 Reward giving unit for keeper
44 Learning agent determination unit
p Learning program

The invention claimed is:

1. A learning device comprising:

a processor configured to perform reinforcement learning of a policy of an agent by self-play under a multi-agent environment in which a plurality of agents are present, wherein:

the multi-agent environment is an asymmetric environment in which at least one of a type of an action performed by the agent, a type of a state acquired by the agent, or a definition of a reward given to the agent is different between the plurality of agents;

an evaluation index for learning is given to each of the plurality of agents, and the processor performs:

a first step of performing learning of a predetermined agent of the plurality of agents using a learning model;

a second step of acquiring the evaluation index for the learning model of the predetermined agent after learning;

a third step of comparing the evaluation index for the determined agent with the evaluation index for a different agent;

a fourth step of, among the predetermined agent and other agents of the plurality of agents, performing repeatedly the learning of the policy of the predetermined agent, which is the lower evaluation index, using the learning model until the evaluation index is greater than the evaluation index of the different agent; and a fifth step of, when the evaluation index of the predetermined agent is greater than the evaluation index of the different agent, terminating training of the predetermined agent, setting the agent having the lower evaluation index as a learning target and returning to the first step, the processor repeatedly executed the first step to the fifth step;

the evaluation index for learning is a rating that expresses a strength of the predetermined agent and the different agent;

the multi-agent environment is an environment in which the plurality of agents are defined by unmanned vehicles on an invasion side fighting against a plurality of agents as unmanned vehicles on a defense side, and the state acquired by the unmanned vehicles on the invasion side and the unmanned vehicles on the defense side is a measurement result of a radar or a sonar;

when the learning model learned by the unmanned vehicle on the defense side in the multi-agent environment is installed in an actual unmanned vehicle, the actual unmanned vehicle performs defense based on the learning model that has been learned, and wherein the comparing the evaluation indexes includes:

calculating a difference between the evaluation index for the predetermined agent and the evaluation index for the different agent; and changing, when it is determined that learning has not progressed based on the calculated difference in a case in which the calculated difference is not reduced even if the learning step is repeatedly performed, the learning model of the agent in which learning has not progressed to a learning model having a different evaluation index.

2. A learning method for performing reinforcement learning of a policy of an agent by self-play under a multi-agent environment in which a plurality of agents are present, wherein:

the multi-agent environment is an asymmetric environment in which at least one of a type of an action performed by the agent, a type of a state acquired by the agent, or a definition of a reward given to the agent is different between the plurality of agents;

an evaluation index for learning is given to each of the plurality of agents, and the learning method comprises:

a first step of performing learning of a predetermined agent of the plurality of agents using a learning model;

a second step of acquiring the evaluation index for the learning model of the predetermined agent after learning;

a third step of comparing the evaluation index for the determined agent with the evaluation index for a different agent;

a fourth step of, among the predetermined agent and other agents of the plurality of agents, performing repeatedly the learning of the policy of the predetermined agent, which is the lower evaluation index, using the learning model until the evaluation index is greater than the evaluation index of the different agent;

a fifth step of, when the evaluation index of the predetermined agent is greater than the evaluation index of the different agent, terminating training of the predetermined agent, setting the agent having the lower evaluation index as a learning target and returning to the first step; and repeatedly executing the first step to the fifth step;

the evaluation index for learning is a rating that expresses a strength of the predetermined agent and the different agent;

the multi-agent environment is an environment in which the plurality of agents are defined by unmanned vehicles on an invasion side fighting against a plurality of agents as unmanned vehicles on a defense side, and the state acquired by the unmanned vehicles on the invasion side and the unmanned vehicles on the defense side is a measurement result of a radar or a sonar;

when the learning model learned by the unmanned vehicle on the defense side in the multi-agent environment is installed in an actual unmanned vehicle, the actual unmanned vehicle performs defense based on the learning model that has been learned, and wherein the comparing the evaluation indexes includes:

calculating a difference between the evaluation index for the predetermined agent and the evaluation index for the different agent; and changing, when it is determined that learning has not progressed based on the calculated difference in a case in which the calculated difference is not reduced even if the learning step is repeatedly performed, the learning model of the agent in which learning has not progressed to a learning model having a different evaluation index.

3. A non-transitory computer-readable storage medium storing a learning program for performing reinforcement learning of a policy of an agent by self-play under a multi-agent environment in which a plurality of agents are present in a learning device, wherein:

the multi-agent environment is an asymmetric environment in which at least one of a type of an action performed by the agent, a type of a state acquired by the agent, or a definition of a reward given to the agent is different between the plurality of agents;

an evaluation index for learning is given to each of the plurality of agents; and the learning program, when executed by a computer of the learning device, causes the learning device to execute:

a first step of performing learning of a predetermined agent of the plurality of agents using a learning model;

a second step of acquiring the evaluation index for the learning model of the predetermined agent after learning;

a third step of comparing the evaluation index for the determined agent with the evaluation index for a different agent;

a fourth step of, among the predetermined agent and other agents of the plurality of agents, performing repeatedly the learning of the policy of the predetermined agent, which is the lower evaluation index, using the learning model until the evaluation index is greater than the evaluation index of the different agent; and a fifth step of, when the evaluation index of the predetermined agent is greater than the evaluation index of the different agent, terminating training of the predetermined agent, setting the agent having the lower evaluation index as a learning target and returning to the first step; and repeatedly executing the first step to the fifth step;

the evaluation index for learning is a rating that expresses a strength of the predetermined agent and the different agent;

the multi-agent environment is an environment in which the plurality of agents are defined by unmanned vehicles on an invasion side fighting against a plurality of agents as unmanned vehicles on a defense side, and the state acquired by the unmanned vehicles on the invasion side and the unmanned vehicles on the defense side is a measurement result of a radar or a sonar;

when the learning model learned by the unmanned vehicle on the defense side in the multi-agent environment is installed in an actual unmanned vehicle, the actual unmanned vehicle performs defense based on the learning model that has been learned, and wherein the comparing the evaluation indexes includes:

calculating a difference between the evaluation index for the predetermined agent and the evaluation index for the different agent; and changing, when it is determined that learning has not progressed based on the calculated difference in a case in which the calculated difference is not reduced even if the learning step is repeatedly performed, the learning model of the agent in which learning has not progressed to a learning model having a different evaluation index.

* * * * *